Patented July 27, 1937

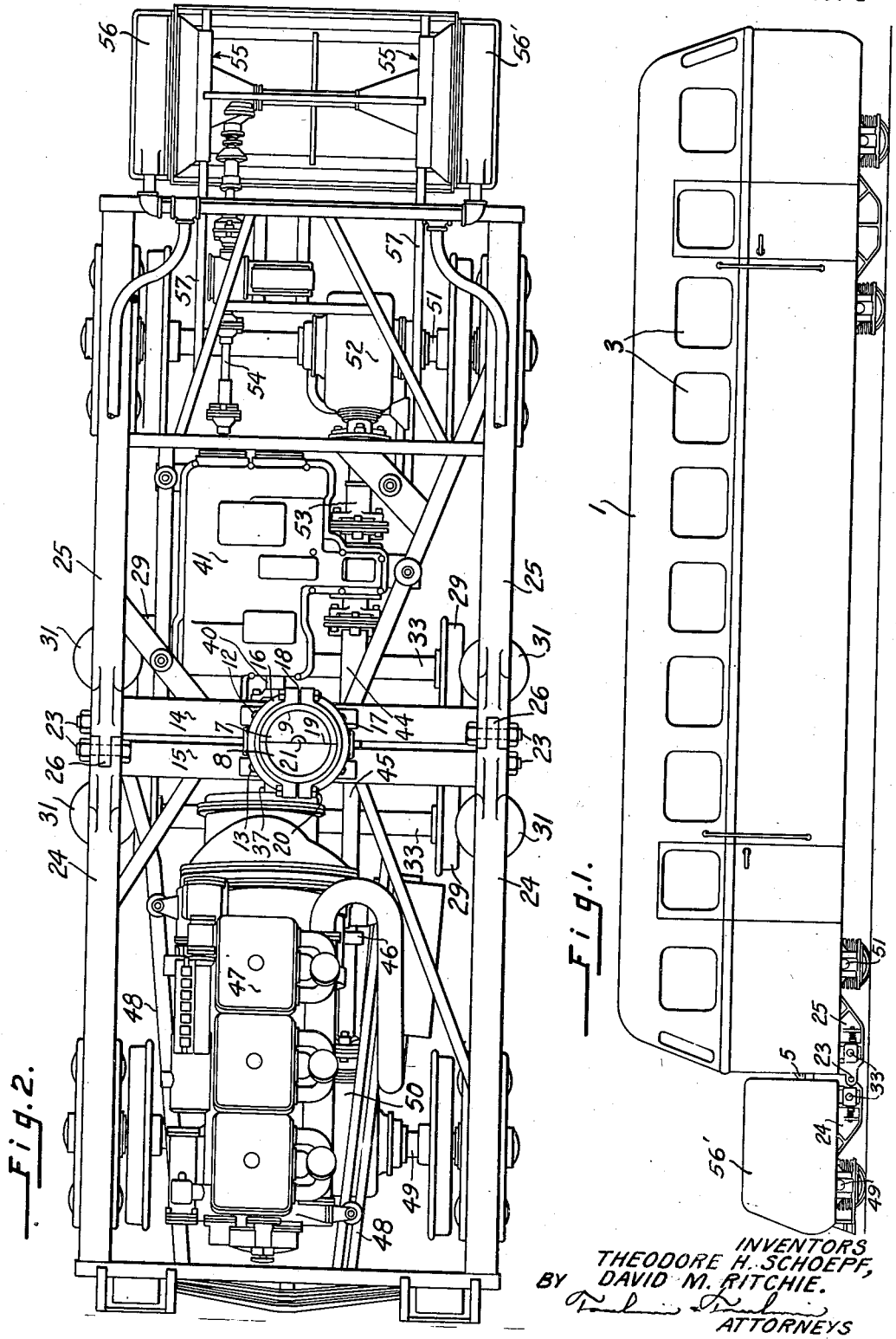

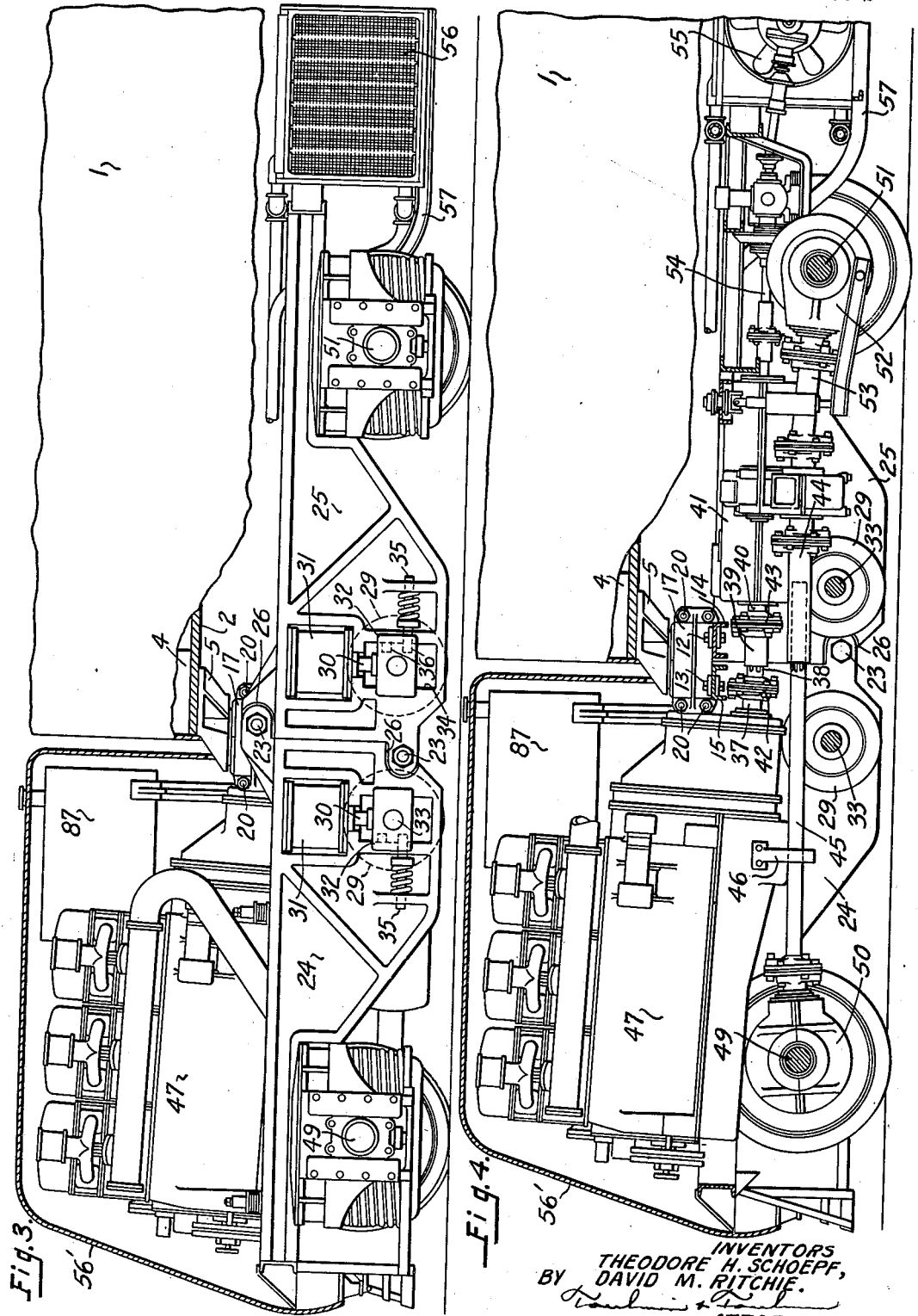

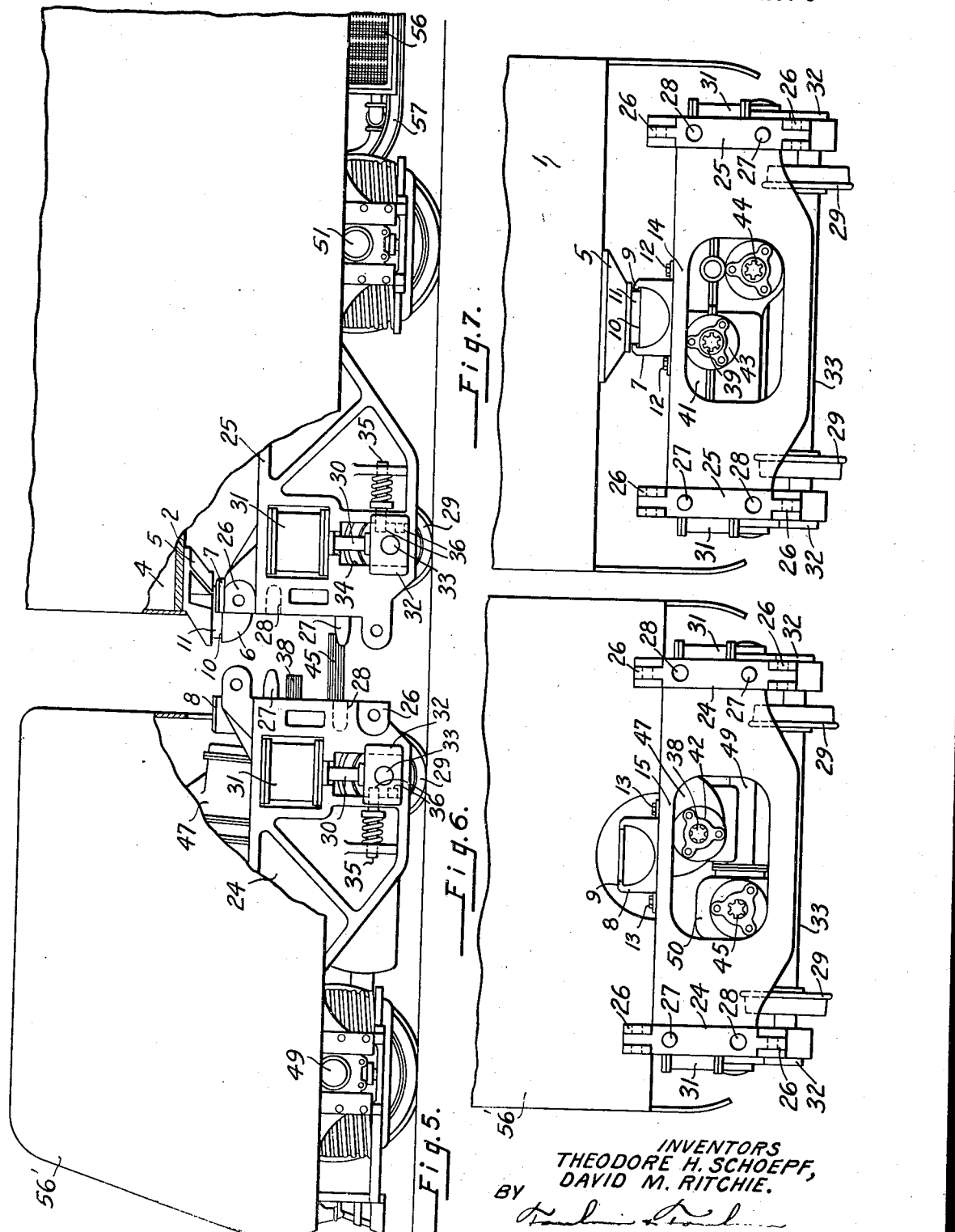

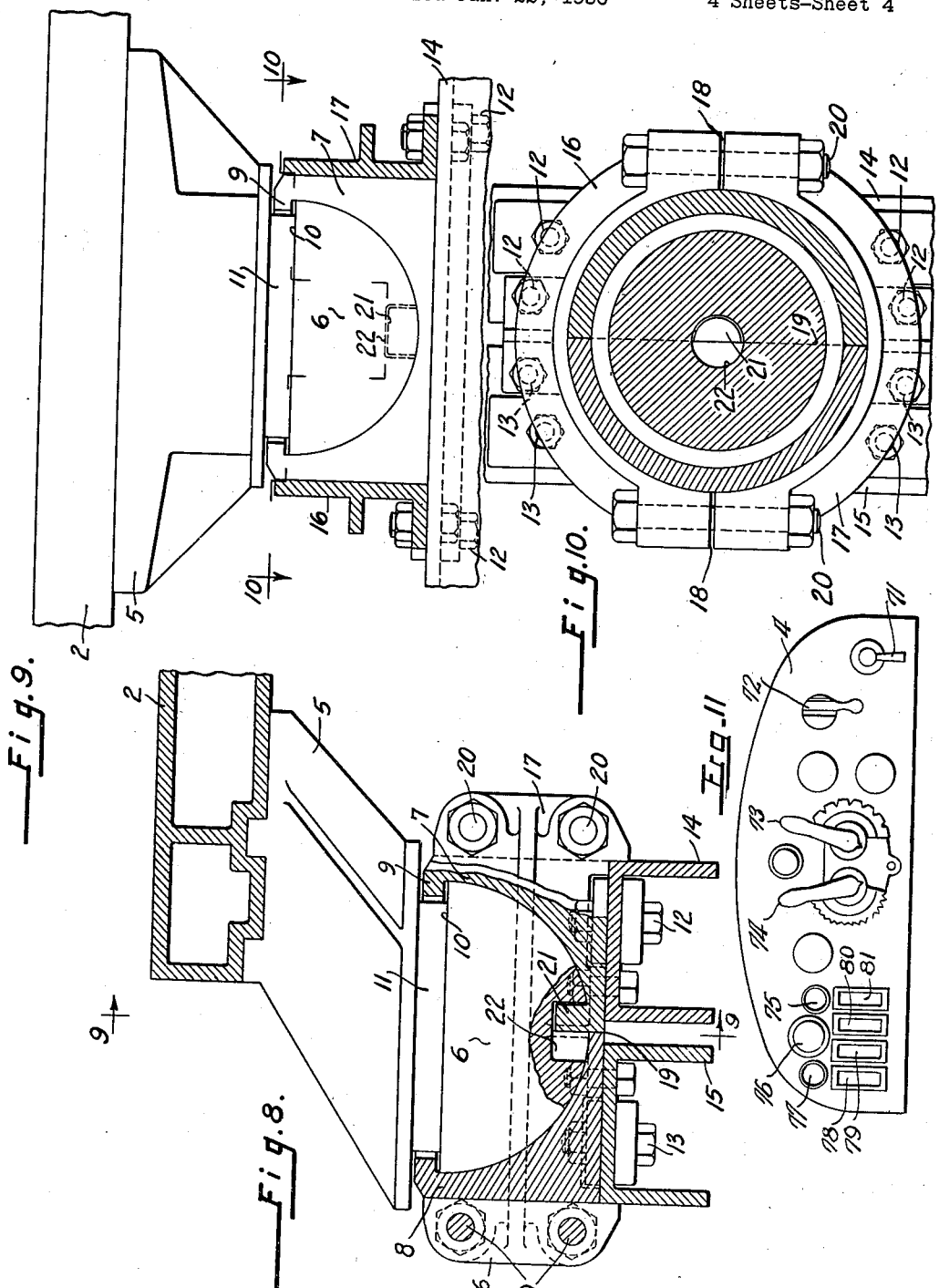

2,088,484

UNITED STATES PATENT OFFICE 2,088,484

ARTICULATED TRAIN

Theodore H. Schoepf and David M. Ritchie, Cincinnati, Ohio, assignors to The Cincinnati Traction Building Company, Cincinnati, Ohio, a corporation of Ohio Application January 22, 1936, Serial No. 60,297

9 Claims. (Cl. 105—62)

Our invention relates to articulated vehicles and in particular, to an exteriorly-located detachable motive power unit mounted upon a common truck structure which supports one end of the vehicle.

It is an object of the invention to provide for an articulated support of the vehicle on the truck so that the vehicle only overlaps a portion of the truck and so arranged that the motive power unit is entirely exterior of the vehicle and can be detached from the vehicle either with all of the truck or with part of the truck.

Heretofore the practice has been to have the motive power unit located either on a truck within the vehicle, or on the floor of the vehicle, whence the motive power unit communicates with another driving mechanism, such as gear boxes or motors on the truck beneath the vehicle. Such arrangements have these disadvantages. Whenever it is necessary to repair or replace or service the power units, such as an internal combustion engine, or a generator, or both, it is necessary to place the vehicle out of service. This may mean that one car, or, in an articulated train, the entire train, must be put out of operation while some minor repair is made to the power unit. The additional disadvantage is that the forward portion of the vehicle, usually about one-third or one-half of the length of the vehicle, is occupied by the internal combustion motor, the generator and its associated mechanism, thereby reducing the pay load of baggage or passengers. The further disadvantage is that it places the fire hazard from the engine and electrical machinery in the same compartment with the baggage and passengers. Furthermore, such an arrangement necessitates a cramped space for the operator, usually to one side over the engine. It results in the disadvantage of a high center of gravity. It has the additional disadvantage of filling the vehicle with heat and making it very difficult for the operator to comfortably operate the vehicle during warm weather.

The object of the present invention is to provide the power plant, consisting of the engine or both the engine and the generator, completely outside of the vehicle. Thereby the entire space inside the vehicle is free from heat, danger of fire, obstructions to the operator's vision, and the center of gravity can be kept at the lowest practicable point. The structural characteristics of the vehicle can be designed solely for the carrying of passengers and baggage and need not be strengthened for the carrying of a heavy power plant. The result is that the vehicle can be designed with the lightest practicable construction for high speed without regard to power plant characteristics. Vibration is completely eliminated from the vehicle as the power plant is entirely outside of it. The rocking and swaying due to the high center of gravity of an engine and generator in the car is eliminated.

But the primary purpose that is most advantageous is the fact that the power plant can be detached from the vehicle either by severing that portion of the truck carrying the power plant, or by removing the entire truck, and the substitution of a new truck with a new power plant. Thus, the rail vehicle or the rail train is not put out of operation, due to engine repairs, more than a very short period of time. This makes it possible, as a consequence, to completely and thoroughly service and repair the power unit in the railway shops without being obstructed in that operation by going into a rail vehicle or by the necessity of dismantling the vehicle to get at the power plant. The investment in modern, high-speed rail cars and articulated trains is very large; and as a consequence, to prevent any removal of such equipment from service is a material saving in the economical operation of the railroad. By locating the engine or the engine and generator completely outside the vehicle, it is possible to control the temperature of the apparatus strictly according to the most efficient temperature of the apparatus without regard to the temperature in the vehicle, while heretofore it was necessary to take into consideration the comfort of the operator and of the passengers in determining the temperature at which the engine and generator would be permitted to run.

It is a further important object of this invention to provide this detachable power plant of such height that the operator can readily see over the top of it by being seated in a normal position in front of his control instruments located at the front of the vehicle.

It is a further object to provide a vehicle such as a rail car, which can be detached from its motive power unit and used as an ordinary car in a train of cars, or it may be used as the power car for a train of cars or as an independent rail car. Thus the expense of special purpose vehicles, which have the power plant in them, is eliminated by having the detachable power plant of this invention arranged in the manner we propose.

It is a further object of the invention to provide an arrangement in which the motor, whether gasoline, gas or Diesel, can be so mounted on the truck and the truck can so carry the body that each structure can function at its maximum efficiency. For instance, by locating the power unit, such as the motor, on the truck, it is possible to use mechanical and hydraulic transmissions mounted on the truck, which can not be satisfactorily employed, ordinarily, if the engine is mounted on the floor of the vehicle and the driving mechanism, such as the hydraulic transmission or gears, are located on the truck beneath the floor of the vehicle.

It is a further object to provide a novel form of separable truck, the parts of which can operate together as dual trucks, or, alternatively, can operate as a single truck. It is an object in this connection to provide a trunnion construction for supporting the car on the separable truck in such a manner that upon removal of one half of the truck carrying the power unit, the articulated support for the car body on the remaining half of the truck will continue to function normally, so that the car can be moved on the truck even though one half of the truck has been detached with its power unit. It is an object of the invention to provide in such a separable truck, one half of it for carrying the engine and the other half for carrying the gear box, clutches, etc., because the half carrying the gear box and the like mechanism rarely needs service attention, and therefore can remain with the vehicle, while the engine needs constant service attention.

It is an additional object to provide a unitary truck so arranged that the motive power unit such as an engine, or engine and generator, is suspended between the axles, the forward end of the rail vehicle is mounted on a center bearing with side bearings over one axle, the forward end of the truck has a motor or mechanical drive on the forward axle, and the generator is connected to a motor or motors or other trucks of the vehicle or in the train. When it is desired to remove the power truck, all that is necessary is to lift the forward end of the vehicle and supply a new power truck, connecting and disconnecting the controls between the power truck and the control box in the front of the vehicle.

Referring to the drawings:

Figure 1 is a side elevation of that form of our invention utilizing a rail car with a separable power truck, the forward exterior portion of which carries the engine, while the forward end of the vehicle is pivoted on a center bearing carried adjacent the separation line of the halves of the truck.

Figure 2 is a top plan view of such a truck with the halves joined together.

Figure 3 is a side elevation of such a truck with the engine housing in section, and a part of the body broken away.

Figure 4 is a vertical section through the truck with the engine housing in section, and a part of it broken away.

Figure 5 is a side elevation of the truck separated with the supplementary wheels in their lower position, so that each half of the truck can function as a complete unit: A part of the engine housing and a part of the vehicle body are cut away to disclose the arrangement.

Figure 6 is a rear elevation of the power unit half of the truck.

Figure 7 is a similar view looking at the end of the car half of the truck after the engine or power unit has been removed.

Figure 8 is a detail view of the trunnion and center bearing and the pair of associated bolsters forming the articulated construction between the car body and the truck when the halves of the truck are joined together.

Figure 9 is a section on the line 9—9 of Figure 8.

Figure 10 is a section on the line 10—10 of Figure 9, looking in the direction of the arrows.

Figure 11 is a plan view of the control dashboard, showing the typical controls.

Referring to the drawings in detail, 1 designates a rail vehicle body which is provided with a floor 2 and a series of windows 3. In the forward end of the body there is provided a place for an operator, who has a control box 4 on which a number of control instruments are located, as shown in Figure 11. The exact nature of this control box and its connections to the power mechanism will be explained hereinafter. At this point it is important to observe that the operator has a free and unobstructed vision through the forward windows and is located in the car adjacent the front end, under the same temperature conditions as the rest of the vehicle, so that where air conditioning is employed, the entire car may be air conditioned, including the motorman's compartment, which is a matter of vital importance in countries having excessive heat conditions. There is no power plant of any sort located within the car. The entire car is free and unobstructed for its normal uses of carrying passengers or baggage, or both. The car is a standard unit and may be employed by itself or as one of a train of similar cars.

The forward end of the car body is provided with a depending forwardly-extending bracket casting designated 5, which has a depending semi-circular trunnion 6 mounted within a two-part semi-circular cup or center bearing, the halves of which are respectively designated 7 and 8. The center bearing halves 7 and 8 are provided with an overhanging flange 9 that extends over a shoulder 10 on the trunnion 6 between the top of the shoulder 10 and the bottom of the bracket 5, because the trunnion 6 is connected to the bracket 5 by a restricted throat member 11.

The halves 7 and 8 are mounted by bolts 12 and 13 on the bolsters 14 and 15 respectively, constituting the bolsters of the rear, car half, and the front, engine half, of the truck. When the two halves are joined together they are encircled by the split clamp consisting of the halves 16 and 17, the parting line of which at 18 is at right angles to the parting line 19 between the truck halves. The bolts 20 retain the clamping halves 16 together.

When the truck halves are separated after the removal of the clamping members 16 and 17, the trunnion 6 is prevented from slipping out of the remaining half 7, which supports it, because a projecting lug 21 on the base of the socket half 7 extends into a socket 22 in the base of the trunnion 6. The recess 22 is cylindrical and the projecting member 21 is semi-circular in section.

Separable truck

When it is desired to divide the truck into the car half and the power unit half, the bolts 23 are withdrawn so that the interlocking dovetail construction between the side frames 24 and 25 at 26 may be separated. This likewise permits of the removal of the aligning pins 27 from their corresponding sockets 28 and the truck side frames. Prior to this separation, the supplementary wheels 29 are lowered by the piston rods 30, operated upon by the air in the cylinders 31.

Piston rods 30 engage the journal blocks 32, which guide the axles 33 of the supplementary wheels 29 to and from the rail. These blocks travel in the slot 34 of the side frames. A spring-pressed locking pin 35 is adapted to enter either one of the apertures 36 for locking the supplementary wheels 29 in either their lowered or their upper, inoperative, positions. When the truck halves are separated, this results in detaching the power drive shaft driven from the crank shaft of the engine and designated 37, together with its splined section 38, from the interiorly grooved collar 39, connected to the shaft 40 of the gear box 41. Flexible couplings 42 and 43 respectively connect the shafts 37 and 38 and 39 and 40, to one another.

Likewise, the connection between the gear box and the forward axle is severed by sliding apart the driving sleeve 44 and the splined driven shaft 45. The latter is supported from dropping down by a suitable bracket 46 mounted upon the engine or upon the forward half of the truck frame.

The engine 47 is mounted upon the supplementary frame 48, on the forward truck frame. The forward truck frame is provided with one of the main axles 49 and a gear box 50 for receiving the gears driven by the shaft 45.

The rear half of the truck is provided with a main axle 51, gear box 52 containing the gears driven by the jack shaft 53, which is likewise driven from the gears in the gear box 41. The gear box 41 also drives the fan shaft 54 which in turn drives the fan 55, for drawing air over the radiator 56 supported on the bracket 57 on the rear end of the truck. This radiator may be either used for air conditioning apparatus, or may be used for the prime mover engine 47. In the event of the latter arrangement, suitable jump-over pipe connections are employed. Likewise, suitable jump-over connections are employed for connecting the throttle controls of the engine to the control board 4 in the car. These details are hereinafter explained.

Thus in this arrangement we have provided the forward half of the truck with an engine having a housing 56', the total height of which is less than the height of the forward windows of the vehicle 1, so that the operator may see over the power plant. This housing can be removed for minor adjustment repairs of the engine, or if a new engine is to be installed in connection with the car, the truck is separated after lowering the supplementary wheels of the engine portion of the truck and the supplementary wheels of the rear half of the truck. The front half is detached, moved away, and a new front half with a new engine re-attached.

The gasoline and oil supply may be provided from a tank 87 mounted on the frame of the front half of the truck behind the engine. If desired, the oil supply tanks may be carried on the rear half of the truck or beneath the vehicle body, but by placing the tank on the front half of the truck, jump-over connections are avoided, a short connection to the engine can be made, and if desired, a gravity supply to the engine can be provided.

The power plant is supported with a low center of gravity so that the total height of the power plant, including its cover, is less than the height from the ground to the windows of the vehicle to enable the operator to readily see over the top of the power plant. The power plant is also detachable as a unit on its truck from the vehicle, so that a new one can be substituted without disturbing the vehicle.

The electrical control wires and the engine controls are connected by suitable jump-overs to the control box 4. A diagrammatic view of the control box is shown in Figure 11, where any arrangement of controls may be provided for controlling the operation of the engine and the operation of the generator and electric motors, the details of which are conventional. It is a feature of our invention, however, to place the engine and electric controls in the car compartment where the operator sits, and to place all of the controlled apparatus outside of the car on the engine truck, within a separate housing, thereby eliminating fire hazard, reducing heat, noise, smoke and odors, and placing the machinery in a position where it can most effectively operate, both mechanically and with respect to its temperature. In this instance the forward end of the truck is provided with a suitable radiator 70 for the engine 47.

Returning to the control box 4 as shown in Figure 11, 71 designates the ignition switch, 72 the whistle control, 73 the gasoline engine throttle control, 74 the electric motor control, 75 the starting battery charging instrument dial, 76 the engine tachometer, 77 the voltmeter, 78 the gasoline gauge, 79 the oil gauge, 80 the water temperature, 81 the oil temperature gauge.

It will be understood that the trunnion support for the forward end of the car may be placed further forward, closer to the engine, but we have found that the arrangement as indicated is a preferable one in connection with our experience and study with this matter.

It will be understood that we desire to comprehend within our invention such modifications as may be necessary to adapt it to varying conditions and uses.

Having thus fully described our invention, what we claim as new and desire to secure by Letters Patent, is:

1. In combination, a two-part truck, the parts of which are detachably attached to one another; a car body pivotally mounted on said truck in such a manner that one half of the truck projects in front of the body, means for retaining the car body pivotally on the rear half of the truck when the truck halves are separated, and means on each half of said truck comprising supplementary wheels and axles for additionally supporting the halves of the truck when the truck halves are separated.

2. In combination, a two-part truck, the parts of which are detachably attached to one another, a car body pivotally mounted on said truck in such a manner that one half of the truck projects in front of the body, means for retaining the car body pivotally on the rear half of the truck when the truck halves are separated, a power plant mounted on the forward half of the truck, and means on each half of said truck comprising supplementary wheels and axles for additionally supporting the halves of the truck when the truck halves are separated.

3. In combination, a two-part truck having main axles and wheels remote from one another; supplementary axles and wheels adjacent to one another and to the line of separation of the halves of the truck, means to detachably attach the halves of the truck, means to pivotally support a car body over the separation line of the halves of the truck so as to be detachably supported on the front half and permanently supported on the rear half; a power plant on the front half of the truck, and driving mechanism connected to the main axle on the rear half of the truck detachably attached to said power plant.

4. In combination, a two-part truck having main axles and wheels remote from one another; supplementary axles and wheels adjacent to one another and to the line of separation of the halves of the truck, means to detachably attach the halves of the truck, means to pivotally support a car body over the separation line of the halves of the truck so as to be detachably supported on the front half and permanently supported on the rear half; a power plant on the front half of the truck, driving mechanism connected to the main axle on the rear half of the truck detachably attached to said power plant, and means to detachably attach the driven mechanism on the rear half of the truck to the main axle on the front half of the truck.

5. In combination, a two-part truck, such parts being attachable and detachable to and from each other, means of pivotally supporting a car body on said truck so that the front portion of the truck extends beyond the car body; and a power plant mounted on the front half of the truck detachably connected to the rear half of the truck to drive it.

6. In combination, a two-part truck, such parts being attachable and detachable to and from each other, means of pivotally supporting a car body on said truck so that the front portion of the truck extends beyond the car body; and a power plant mounted on the front half of the truck detachably connected to the rear half of the truck to drive it, said power plant being lesser in height on its half of the truck than the height of the car body.

7. In combination, a two-part truck, such parts being attachable and detachable to and from each other, means of pivotally supporting a car body on said truck so that the front portion of the truck extends beyond the car body; a power plant mounted on the front half of the truck detachably connected to the rear half of the truck to drive it, said power plant being lesser in height on its half of the truck than the height of the car body; control mechanism located in the car body, and means of connecting it to the power plant to effect the control of the driving of the car.

8. In combination, a two-part truck, means of supporting the free ends of the truck when the halves are detached; means of pivotally supporting a car body permanently on one half of the truck and detachably on the other half of the truck, said truck being so arranged that the front half projects in front of the car body; a gear box on the rear half of the truck, means of permanently connecting the gear box to the axle on the rear half of the truck and other means for detachably connecting the gear box to the axle on the front half of the truck; and a power plant on the front half of the truck detachably connected to said gear box.

9. In combination, a two-part truck, means of supporting the free ends of the truck when the halves are detached; means of pivotally supporting a car body permanently on one half of the truck and detachably on the other half of the truck, said truck being so arranged that the front half projects in front of the car body; a gear box on the rear half of the truck, means of permanently connecting the gear box to the axle on the rear half of the truck and other means for detachably connecting the gear box to the axle on the front half of the truck; a power plant on the front half of the truck detachably connected to said gear box; and a control box in the car body adapted to control the operation of said power plant, said control box being located so that the operator thereof can see over and beyond the power plant.

THEODORE H. SCHOEPF.
DAVID M. RITCHIE.